US006111518A

United States Patent [19]

Han

[11] Patent Number: 6,111,518

[45] Date of Patent: Aug. 29, 2000

[54] METHOD AND APPARATUS FOR LOCKING A REMOTE CONTROLLER AND THE ELECTRONIC APPARATUS

[75] Inventor: Sang-Rok Han, Yongin, Rep. of Korea

[73] Assignee: Samsung Electronics Co., Ltd., Kyungki-do, Rep. of Korea

[21] Appl. No.: 08/998,761

[22] Filed: Dec. 29, 1997

[30] Foreign Application Priority Data

Dec. 27, 1996 [KR] Rep. of Korea .................... 96-73896

[51] Int. Cl.[7] .................................................. H04Q 5/22

[52] U.S. Cl. ............................ 340/825.56; 340/825.69; 340/825.72; 348/734

[58] Field of Search ........................ 340/825.69, 825.72, 340/825.31, 825.56, 825.22, 825.63; 341/176, 22, 23; 348/734, 5.5; 359/142, 145, 146, 148; 455/151.1, 151.2

[56] References Cited

U.S. PATENT DOCUMENTS

| | | | |
|---|---|---|---|
| 4,456,972 | 6/1984 | Lee et al. | 341/22 |
| 4,670,747 | 6/1987 | Borras | 340/825.56 |
| 5,214,421 | 5/1993 | Vernon et al. | 340/825.03 |
| 5,579,523 | 11/1996 | Tanaka | 395/726 |
| 5,664,097 | 9/1997 | Johnson et al. | 341/22 |

*Primary Examiner*—Michael Tokar
*Assistant Examiner*—Jean B. Jeanglaude
*Attorney, Agent, or Firm*—Sughrue, Mion, Zinn, Macpeak & Seas, PLLC

[57] ABSTRACT

A remote controller for use with a piece of electronic equipment is locked by depressing a predetermined key mounted thereon for a predetermined amount of time. The remote controller includes a plurality of keys. If a user has depressed the predetermined key of the remote controller and does not depress another key within the predetermined amount of time, the remote controller and the electronic equipment will execute an entering/releasing locking mode operation. Alternatively, however, in cases where the user depresses another key within the predetermined amount of time after depression of the predetermined key, the remote controller operates in a normal operation mode.

15 Claims, 4 Drawing Sheets

METHOD AND APPARATUS FOR LOCKING A REMOTE CONTROLLER AND THE ELECTRONIC APPARATUS

BACKGROUND OF THE INVENTION

1. Field of the Invention

The present invention relates to a remote controller, and more particularly to a method for locking a remote controller by using a particular key mounted thereon.

2. Description of the Related Art

In general, electronic apparatuses include a number of function keys mounted on a front panel thereof, for controlling functions of the electronic equipment. Further, the electronic equipment may have a remote controller for remotely controlling the equipment functions.

However, while watching a television receiver having a remote controller, the user, or even children, may for example, inadvertently mishandle the remote controller so that the television receiver undesirably changes its channel, volume, or another feature such as the screen color. Therefore, there arises a need to lock the remote controller. A known improvement of the remote controller includes a separate locking key for locking the remote controller. Alternatively, the remote controller may include a separate power switch to lock the remote controller by turning off the power switch.

However, by including the separate locking key or power switch for the locking mode, the conventional remote controller may become structurally complicated and the cost accordingly increases.

SUMMARY OF THE INVENTION

It is an object of the present invention to provide a method for locking a remote controller by using a predetermined key mounted thereon to avoid the problems described above.

It is another object of the present invention to provide an apparatus for locking a remote controller by using a predetermined key mounted thereon to avoid the problems described above.

According to an aspect of the present invention, a remote controller for use in an electronic equipment includes a plurality of keys. The remote controller checks whether or not a user has depressed the predetermined key of the remote controller. As a result, if the user depresses the predetermined key on the remote controller and then does not depress another key within a predetermined amount of time, the remote controller will be locked.

BRIEF DESCRIPTION OF THE DRAWINGS

The above and other objects, features and advantages of the present invention will become more apparent in the light of the following detailed description of an exemplary embodiment thereof taken with the attached drawings in which.

DETAILED DESCRIPTION OF THE INVENTION

Figure 1:
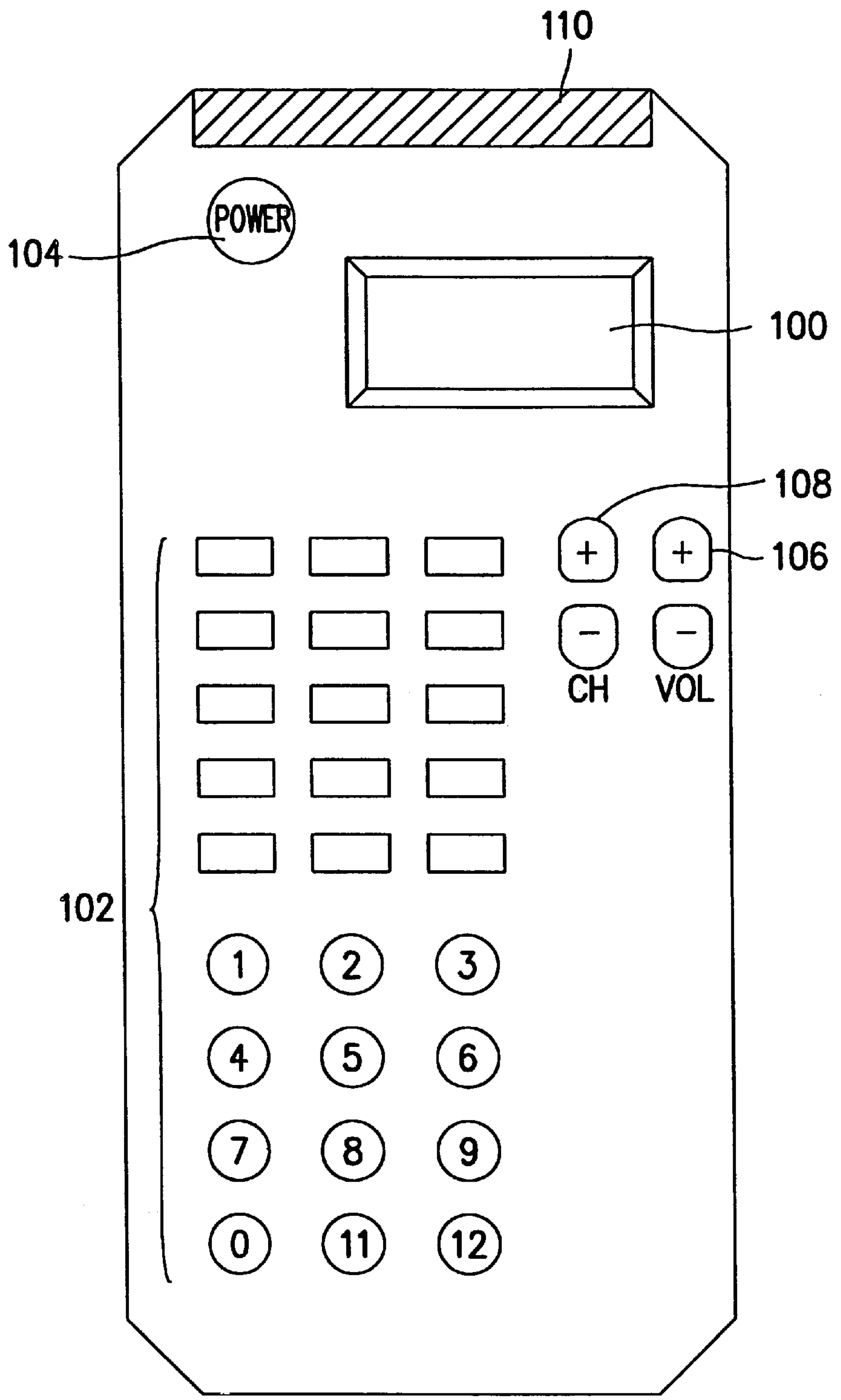
FIG. 1 is a front view of a remote controller according to an embodiment of the present invention.

A preferred embodiment of the present invention will be described in detail hereinbelow with reference to the attached drawings, in which like reference numerals represent like elements. Further, it should be noted that detailed descriptions on the related prior art may be intentionally omitted if it is believed to be unnecessary in describing the concepts of the present invention.

Referring to FIG. 1, a remote controller according to the present invention includes an infrared ray generator 110 and a liquid crystal display (LCD) 100. The infrared ray generator 110 generates an infrared ray when a key on the remote controller is depressed, and transfers the infrared ray to a light receiving element mounted on an electronic apparatus so as to control functions of the electronic apparatus. The LCD 100 displays various status information of the remote controller. Further, the remote controller includes a power control key 104, a set of channel selection keys 108, a set of volume control keys 106, and a number of function and numeric keys 102.

Figure 2:
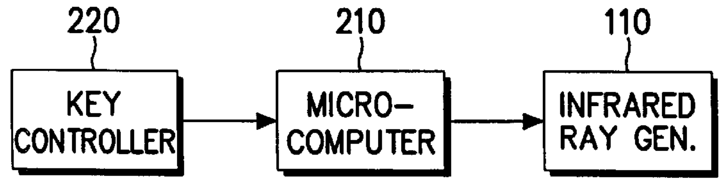
FIG. 2 is a block diagram of a remote controller to which an embodiment of the present invention is applicable.

Referring to FIG. 2, the remote controller includes the infrared ray generator 110, a microcomputer 210, and a key controller 220. The microcomputer 210 controls the overall operation of the remote controller, and in particular, locks the remote controller if a user depresses a particular one of the keys on the remote controller and then does not depress another key within a predetermined amount of time. The key controller 220 includes the function and numeric keys 102.

More specifically, if the user depresses a predetermined key (preferably, a key having a low frequency of use) from among the function and numeric keys 102, and then does not depress another key within the predetermined amount of time, the microcomputer 210 will execute a locking mode operation to lock the remote controller and television receiver. That is, the predetermined key is preferably a key having a purpose other than and in addition to performing a remote controller locking function. For example, if the predetermined key is the "0" key on the numeric keypad, when the user depresses the "0" key and successively depresses a "9" key within the predetermined amount of time, the microcomputer 210 will select a channel 9 and transfer a channel selection signal to the light receiving element mounted on the television receiver. Accordingly, upon receiving that channel selection signal the television receiver will tune to channel 9. However, if the user depresses the "0" key and does not depress another key within the predetermined amount of time, the microcomputer 210 will execute the locking mode operation and will transfer a locking signal to the light receiving element. Thereupon, the remote controller will enter a locking mode.

Alternatively, if the predetermined key is continuously depressed for a first predetermined amount of time, and then no other key is depressed within a second predetermined amount of time, the remote controller and television receiver execute either a locking entering or releasing mode, depending on the mode of the remote controller and television receiver.

Figure 3:
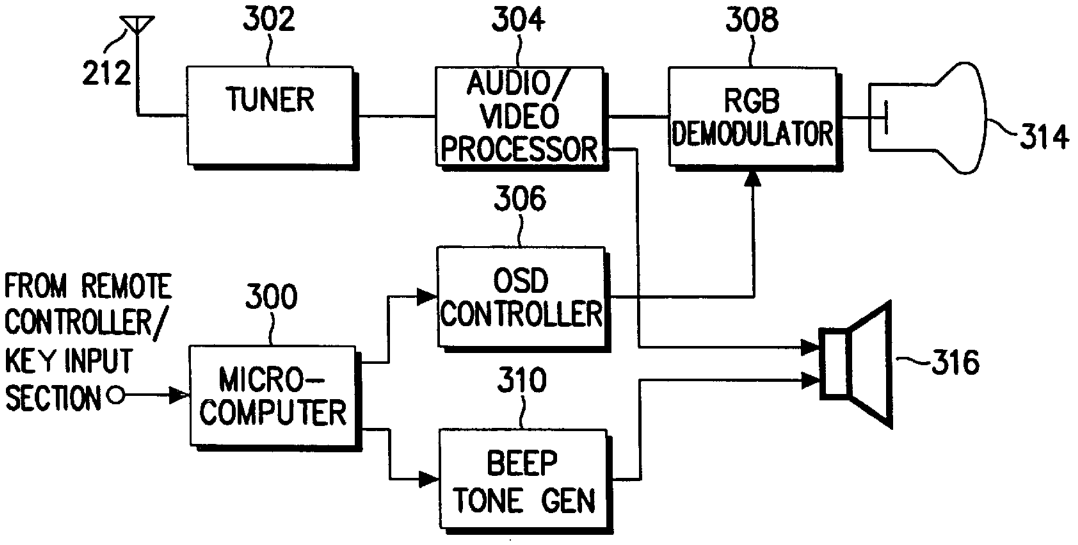
FIG. 3 is a block diagram of a television receiver to which an embodiment of the present invention is applicable.

FIG. 3 illustrates a block diagram of a television receiver to which the present invention is applicable. As illustrated, a microcomputer 300 receives key input signals from a light receiving element or generated by a key input section (not shown) of the television receiver to generate control signals for controlling the television receiver. The key input section includes a locking key. If the locking key is depressed by the user, the microcomputer 300 will cut-off the remote control signals from the remote controller thereby locking the remote controller. A tuner 302 tunes audio and video signals received through an antenna 212. An audio/video processor 304 processes the audio and video signals output from the tuner 302. An RGB demodulator 308 receives the video signal output from the audio/video processor 304 and generates a color signal to reproduce a color image of the video signal. A cathode ray tube (CRT) 314 receives the color signal output from the RGB demodulator 308 to display the color image. An OSD (on-screen display) controller 306 generates a warning message and a locking status message which are output to the RGB demodulator 308, under control of the microcomputer 300. A speaker 316 receives the audio signal output from the audio/video processor 304 to restore the original sound from the audio signal. A beep tone generator 310 generates a beep tone signal and outputs it to the speaker 316 under the control of the microcomputer 300.

Now, operation of the remote controller according to the present invention will be described in detail with reference to FIGS. 1 through 4.

Figure 4:
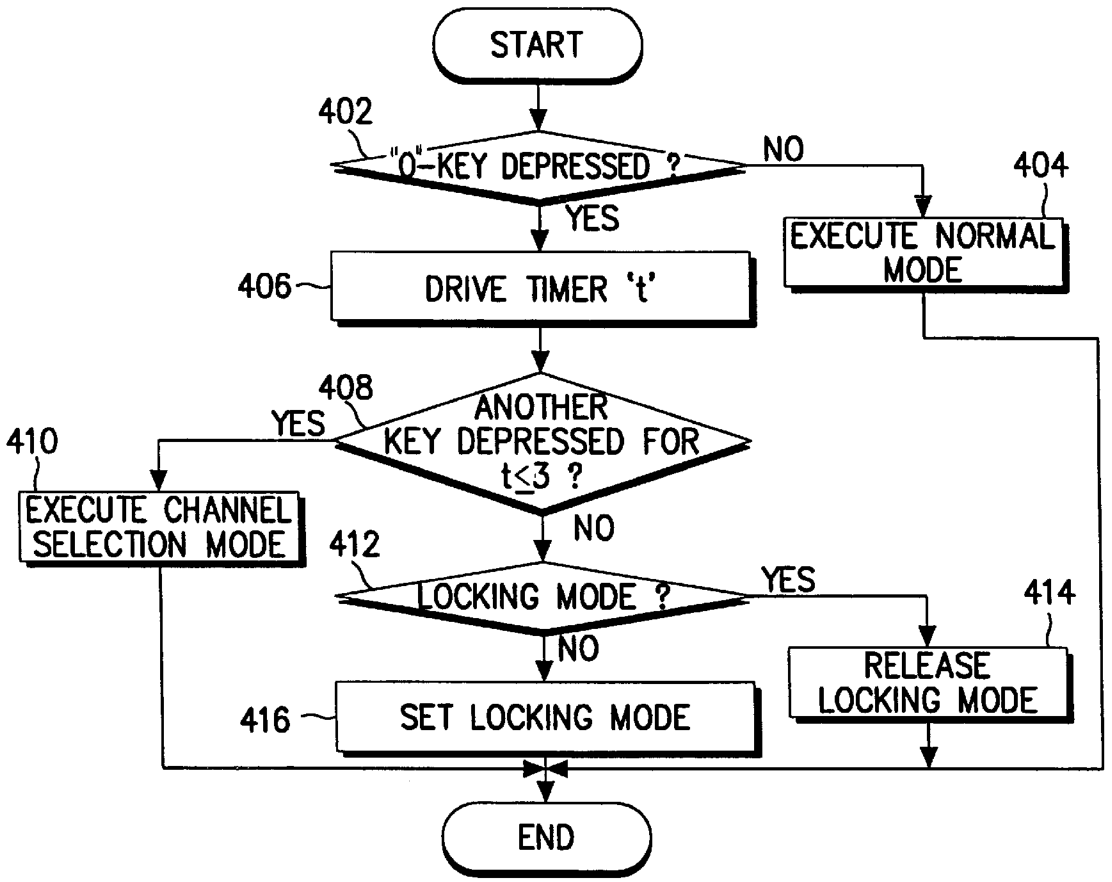
FIG. 4 is a flow chart for explaining operation of the remote controller shown in FIG. 2 according to an embodiment of the present invention.

First, referring to FIG. 4, the microcomputer 210 checks at step 402 whether or not the user has depressed the predetermined key, e.g., the "0" key. If the "0" key is not depressed, the microcomputer 210 will execute normal mode operations at step 404. However, if the "0" key is depressed the microcomputer 210 will drive a timer 't' at step 406. Then, at a step 408, the microcomputer 210 checks whether or not the user has depressed another key before the timer 't' reaches the predetermined amount of time, e.g., three seconds. If the user has depressed another key, e.g., the "9" key, within the predetermined amount of time, in this example within three seconds, the microcomputer 210, at step 410, will cause the infrared ray for the selected channel to be transferred to the light receiving element mounted on the television receiver so as to tune the selected channel (e.g. channel "9"). However, if the user has not depressed another key within the predetermined amount of time (e.g., three seconds), the microcomputer 210 will check at step 412 whether or not the remote controller is presently in the locking mode. If the remote controller is presently in the locking mode the microcomputer 210 will transfer a locking mode release signal to the television receiver to release the locking mode, at step 414. However, if the remote controller is not in the locking mode the microcomputer 210, at step 416, will transfer a locking mode setting signal to the television receiver to set the locking mode.

Figure 5:
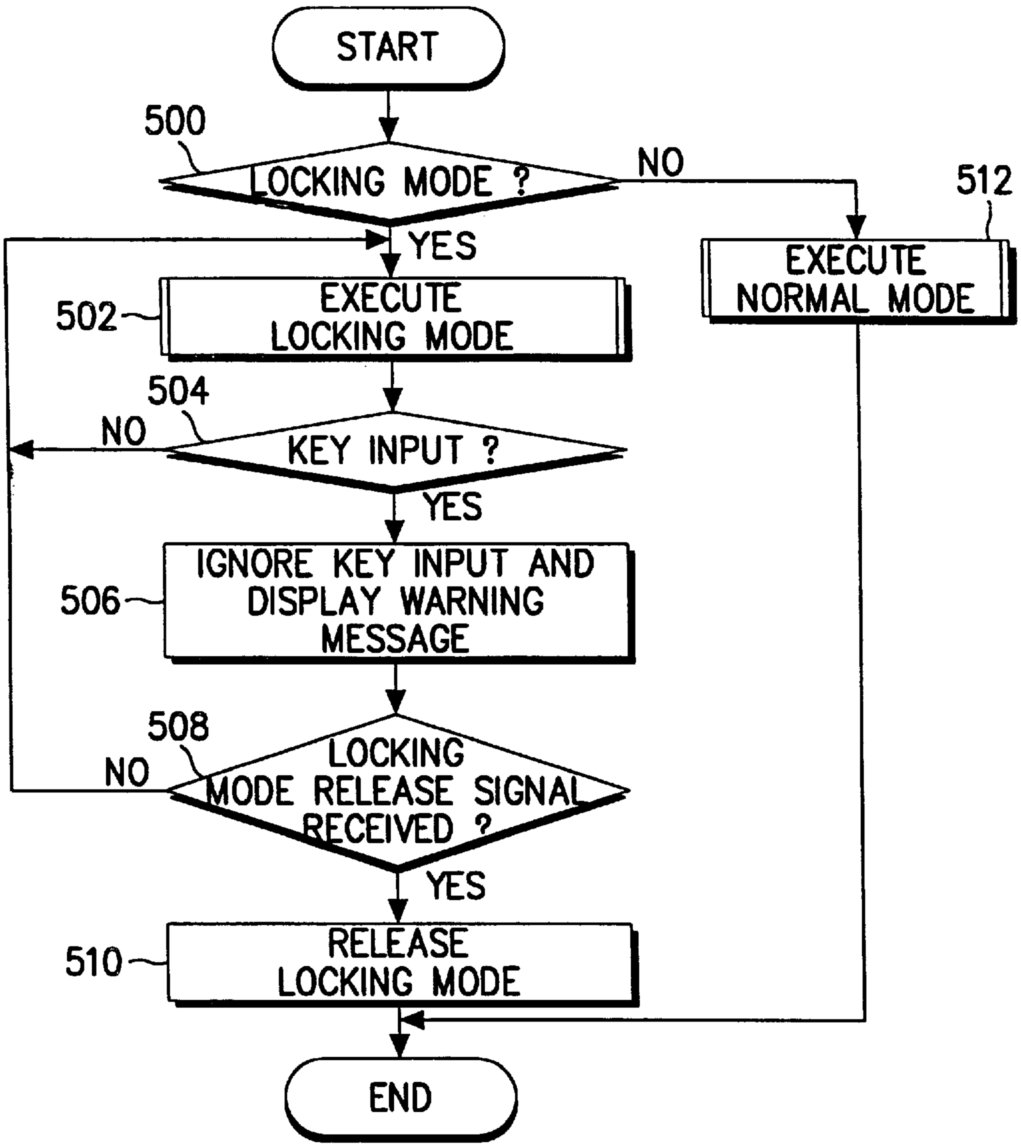
FIG. 5 is a flow chart for explaining operation of a microcomputer in a television receiver shown in FIG. 3 according to an embodiment of the present invention.

Next, referring to FIG. 5, the microcomputer 300 in the electronic apparatus (e.g., the television receiver) checks, at step 500, whether or not the present operation mode is the locking mode. If the present operation mode is not the locking mode the microcomputer 300 will execute a normal mode operation at step 512. However, if the present operation mode, is the locking mode, the microcomputer 300 will execute the locking mode operation at step 502. Then, at step 504, the microcomputer 300 checks whether or not a key input is received from the remote controller. If the key input is not received from the remote controller, the procedure will return to step 502 to continuously execute the locking mode operation. However, if the key input is received from the remote controller, the microcomputer 300, at step 506, will ignore the key input from the remote controller and generate a beep tone and/or a warning message, sending them to the speaker 316 and the cathode ray tube 314, respectively, via the beep tone generator 310 and the OSD controller, respectively. Then, the microcomputer 300 checks at step 508 whether or not the locking mode release signal is received from the remote controller. If the locking mode release signal is not received from the remote controller, the procedure will return to step 502 to continuously execute the locking mode operation. However, if the locking mode release signal is received from the remote controller the microcomputer 300 will release the locking mode at step 510.

As can be appreciated from the foregoing descriptions, the present invention locks the remote controller by using a predetermined existing key having a low frequency of use for a purpose other than locking the remote controller, so that the remote controller does not need to have a separate locking key or a separate power switch. Accordingly, the structure of the inventive remote controller is simplified over an existing remote controller and can be manufactured at a low cost.

Although a preferred embodiment of the present invention has been described in detail hereinabove, it should be clearly understood that many variations and/or modifications of the basic inventive concepts herein taught which may appear to those skilled in the art, still fall within the spirit and scope of the present invention as defined by the appended claims.

What is claimed is:

1. A method for locking a remote controller having a plurality of keys for use with an electronic apparatus, comprising:

checking whether a user has depressed a predetermined key of the remote controller; and locking the remote controller, if the user does not depress another key of the remote controller within a predetermined amount of time.

2. The method for locking the remote controller according to claim 1, wherein said locking the remote controller includes the remote controller executing one of a locking and releasing operation when the predetermined key of the remote controller is depressed for another predetermined amount of time.

3. The method for locking a remote controller according to claim 1, wherein the predetermined key is for executing an operation other than entering or releasing the locking mode when the other key is depressed within less than the predetermined amount of time of depressing the predetermined key.

4. The method for locking a remote controller according to claim 1, wherein the remote controller executes an operation other than entering or releasing the locking mode, in response to depressing the predetermined key and depressing the other key within an amount of time less than the predetermined amount of time.

5. The method for locking the remote controller according to claim 1, further comprising locking the remote controller if a locking key mounted on the electronic apparatus is depressed.

6. The method for locking the remote controller according to claim 1, wherein the remote controller is locked by the electronic apparatus entering a locking mode.

7. The method for locking the remote controller according to claim 6, wherein locking the remote controller includes:

checking whether the electronic apparatus is in a locking mode; and the remote controller transmitting a locking signal mode setting signal to the electronic apparatus if the electronic apparatus is not in the locking mode, thereby preventing signals other than a locking mode reset signal from controlling operation of the electronic apparatus.

8. The method for locking the remote controller according to claim 6, further comprising displaying a locking status message if the remote controller is in the locking mode and a key of the remote controller is depressed.

9. The method for locking the remote controller according to claim 6, further comprising generating a warning tone if another key is depressed while the remote controller is in the locking mode.

10. The method for locking the remote controller according to claim 1, wherein said predetermined amount of time is three seconds.

11. A method for locking a remote controller having a plurality of keys for use with an electronic apparatus, comprising:

determining whether a present operation mode of the remote controller is a locking mode, if a predetermined key of the remote controller is depressed and another one of the plurality of keys is not depressed within a predetermined amount of time;

executing a locking mode operation if the present operation mode is determined not to be the locking mode; and releasing the locking mode if the present operation mode is determined to be the locking mode.

12. The method for locking a remote controller according to claim 11, wherein the predetermined key is for executing an operation other than entering or releasing the locking mode, when depressed for less than the predetermined amount of time.

13. The method for locking a remote controller according to claim 11, wherein upon depressing the predetermined key for an amount of time less than the predetermined amount of time causes the remote controller to execute an operation other than entering or releasing the locking mode.

14. The method for locking the remote controller according to claim 1, wherein in case the remote controller is in a locking mode, any function keys mounted on the electronic apparatus are all locked, and in case the remote controller is in a releasing mode, the function keys mounted on the electronic apparatus are all released.

15. The method for locking the remote controller according to claim 11, wherein in case the remote controller is in a locking mode, any function keys mounted on the electronic apparatus are all locked, and in case the remote controller is in a releasing mode, the function keys mounted on the electronic apparatus are all released.

* * * * *